United States Patent [19]

Yanagida

[11] 4,356,520

[45] Oct. 26, 1982

[54] MAGNETIC RECORD/REPRODUCTION APPARATUS OF A STATIONARY HEAD TYPE

[75] Inventor: Tuneo Yanagida, Hino, Japan

[73] Assignee: Olympus Optical Co., Ltd., Tokyo, Japan

[21] Appl. No.: 168,196

[22] Filed: Jul. 10, 1980

[30] Foreign Application Priority Data

Jul. 16, 1979 [JP] Japan .................................. 54-90026

[51] Int. Cl.$^3$ ............................................. G11B 15/12
[52] U.S. Cl. ........................................ 360/63; 360/61
[58] Field of Search .................. 360/63, 64, 61, 62

[56] References Cited

U.S. PATENT DOCUMENTS

| | | | |
|---|---|---|---|
| 3,495,047 | 2/1970 | Atsumi et al. | 360/63 |
| 4,019,206 | 4/1977 | Hass | 360/63 |
| 4,180,838 | 12/1979 | Fehrenkamp | 360/63 |
| 4,198,662 | 4/1980 | Schopper | 360/63 |

Primary Examiner—Vincent P. Canney
Attorney, Agent, or Firm—Frishauf, Holtz, Goodman and Woodward

[57] ABSTRACT

Multichannel magnetic heads are connected to record and reproduction signal lines through electronic switching elements. The electronic switching elements are successively switched by the switching control signals to be successively connected to said magnetic heads.

5 Claims, 3 Drawing Figures

MAGNETIC RECORD/REPRODUCTION APPARATUS OF A STATIONARY HEAD TYPE

BACKGROUND OF THE INVENTION

The present invention relates to a magnetic record/reproduction system of a stationary head type and, more particularly, to a magnetic record/reproduction apparatus of a stationary head type to magnetically record and reproduce video signals.

The Video signal must be recorded with a high density. Because of this requirement, a helical scanning system using a rotary magnetic head has been used to record video signals. In the helical head scanning system, however, an extremely high precision is required for the mechanism of the magnetic head assembly. This leads to complexity and enlargement of the mechanism, and increase of the manufacturing cost of the overall system. On the other hand, there has been used a stationary head system. In the stationary head system, the construction of the head portion is simpler than that of the rotary magnetic head. The stationary head system must switch recording tracks by moving the stationary head in the width direction (i.e., transverse direction) of the endless magnetic tape. The necessity of the transverse moving mechanism hinders the cost reduction, reduction of necessary parts, and simplification of maintenance.

SUMMARY OF THE INVENTION

Accordingly, an object of the present invention is to provide a magnetic record/reproduction apparatus of a stationary head type in which the switch of recording tracks is electronically performed with a fewer number of mechanical operating elements.

According to the invention, there is provided a magnetic record/reproduction apparatus of a stationary head type in which an electronic switching circuit is connected to multichannel thin film magnetic heads, and the switching of the electronic switching circuit is controlled by switching control pulses produced from a control circuit whereby the multichannel thin film magnetic heads, or the recording tracks, are electronically switched.

Other objects and features of the invention will be apparent from the following description taken in connection with the accompanying drawings.

DETAILED DESCRIPTION OF THE PREFERRED EMBODIMENT

Figure 1:
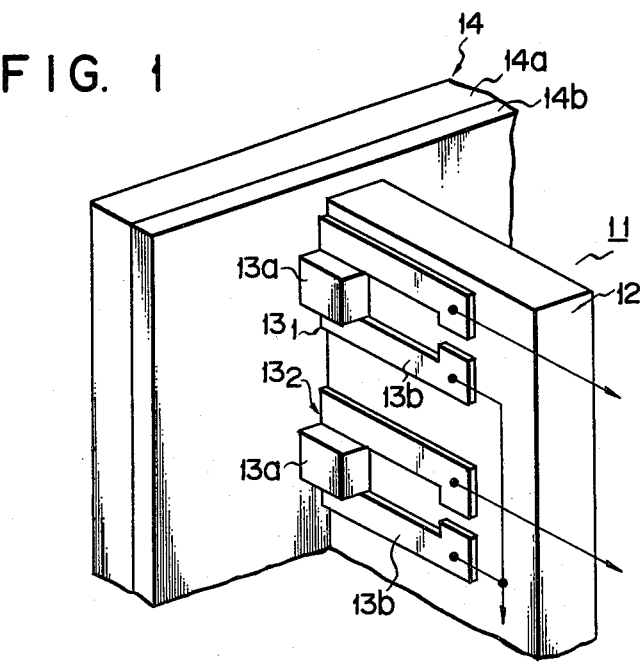
FIG. 1 is a perspective view of a multichannel magnetic head of a magnetic record/reproduction apparatus of a stationary head type according to an embodiment of the present invention.

In FIG. 1, a multichannel magnetic head unit 11 is comprised of a plurality of thin film magnetic heads $13_1$, $13_2$, .... Each of the thin film magnetic heads $13_1$, $13_2$, ... is comprised of a thin film head core 13a so as to be in contact with a magnetic recording medium, or a magnetic tape 14, and a thin film head exciting coil 13b for exciting head core 13a. The magnetic tape 14 includes a base 14a and a magnetic layer 14b formed on the base 14a.

Figure 2:
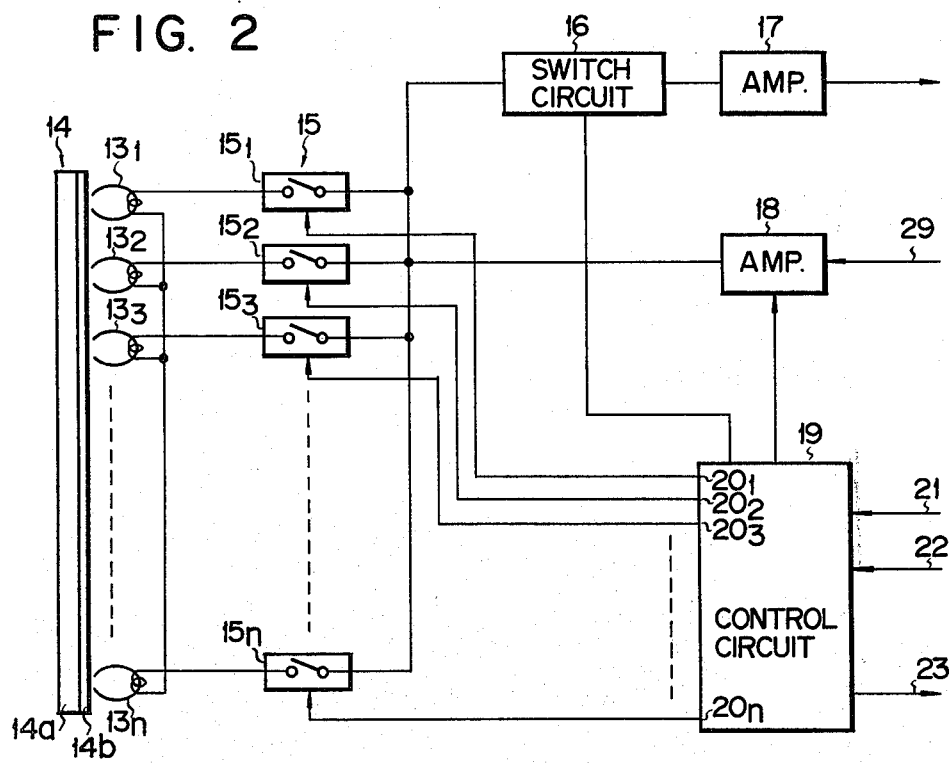
FIG. 2 is a block diagram of the magnetic record/reproduction apparatus of a stationary head type according to the present invention.

As shown in FIG. 2, the magnetic heads $13_1$, $13_2$, $13_3$, ..., $13_n$ of the multichannel thin film magnetic head unit 11 are connected to one respective end of switching circuit elements $15_1$, $15_2$, $15_3$, ..., $15_n$ of a switching circuit 15. The other ends of the switching circuit elements $15_1$ to $15_n$ are commonly connected to a reproduction amplifier 17, through a switch circuit 16. The output terminal of a record amplifier 18 for amplifying a record signal (a video input signal) is connected to the other terminals of the switching circuit elements $15_1$ to $15_n$. A plurality of control output terminals $20_1$, $20_2$, $20_3$, ... $20_n$ of a control circuit 19 are connected to control input terminals of the switching circuit elements $15_1$, $15_2$, $15_3$, ... $15_n$.

Figure 3:
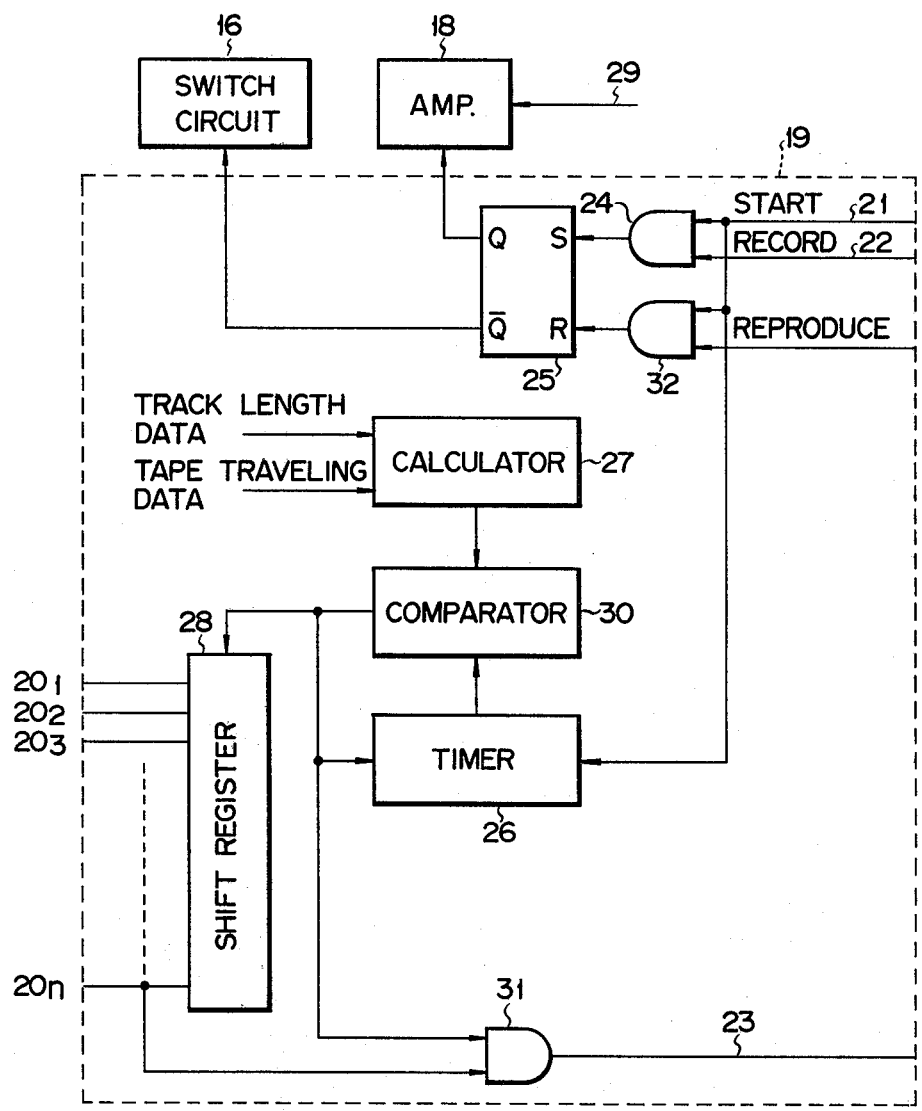
FIG. 3 is a circuit diagram of a detailed control circuit used in the circuit shown in FIG. 2.

In the circuit construction shown in FIG. 2, to record the video signal, when a record button and a start button (not shown) are operated, the magnetic tape 14 starts to run while at the same time a record start pulse and a record mode pulse are applied to the control circuit 19, through lines 21 and 22. In the control circuit 19, an AND gate 24 shown in FIG. 3 responds to the start pulse and the record mode pulse to produce an output signal and to reset a bistable multivibrator 25. The output Q of the multivibrator 25 drives the record amplifier 18 while the output $\overline{Q}$ causes the switch circuit 16 to turn off. At this time, the start pulse operates a timer 26. A calculator 27 calculates the time for allowing the video signal to be recorded on the basis of the track length data and tape traveling data of the magnetic tape. A switch control pulse is supplied to the switching element 15, through the output terminal $20_1$ of the shift register 28, so that the switching element $15_1$ is closed. Under this condition, the video signal supplied through the line 29 is amplified by the amplifier 18 and is supplied through the switching element $15_1$ to a magnetic head $13_1$. As a result, the video signal is recorded on the track corresponding to the magnetic head $13_1$. During the course of the recording, the timer 26 counts the recording time. The count value of the timer 26 is compared with the allowable recording time delivered from the calculator 27, by the comparator 30. When the count value of the timer 26 reaches the allowable recording time, the comparator 30 produces an output pulse to cause the shift register 28 to shift by one. At the same time, it resets the timer 26. Then, the shift register 28 supplies a control pulse to the switching element $15_2$, through the output terminal $20_2$, thereby to cause the element $15_2$ to turn on. At this time, since the switching element $15_1$ does not receive the control pulse, it becomes in the OFF state. Under this condition, the video signal accordingly is applied to the magnetic head $13_2$ of the second channel, so that the video signal is recorded on the second track. In response to the control pulse applied through the output terminals $20_1$ to $20_n$ from the control circuit 19, the switching elements $15_1$ to $15_n$ are successively activiated. With the activations of the switching elements, the tracks of the magnetic tape 14 are successively and electronically switched. Upon the completion of recording of the video signal into all the tracks, the AND gate 31 produces a stop signal in response to the output pulse from the comparator 30 and the control pulse coming through the final stage output terminal from the shift register 28. The stop signal is applied through the line 23 to a stop display device and/or a stop circuit thereby to effect a stop display and/or a stopping of the VTR.

In a reproducing mode, a reproducing button and a start button (not shown) are first depressed. Upon the depression of those buttons, the AND gate 32 of the control circuit 19 supplies a reset signal to the reset terminal R of the multivibrator 25. When the multivibrator 25 is reset, the output Q of the multivibrator renders the amplifier 18 inoperative while the output $\bar{Q}$ of the same renders switch circuit 16 closed. At this time, when the control pulse is supplied from the shift register 28 to the switching element $15_1$ by way of the output terminal $20_1$, the video signal reproduced by the magnetic head $13_1$ is supplied to the reproduction amplifier 17, through the switching element $15_1$ and the switch circuit 16. The reproduced video signal amplified by the reproducing amplifier 17 is supplied to a video circuit of a television receiver, for example. Also in the reproduction mode, the control circuit 19 compares an allowable reproduction time corresponding to the allowable recording time with the reproduction time now in progress. In this comparison, when both times are coincident with each other, the control circuit 19 turns off the switching element $15_1$ while turning on the switching element $15_2$. As a result, the reproduction track is switched. In this way, the reproduction tracks are progressively switched to reproduce the recorded information. When the tracks are all reproduced, a stop pulse is produced from the AND gate 31 through line 23 and in turn effects the stop display and/or stop operation.

As described above, according to the present invention, in the record and reproduction modes, the tracks on the magnetic tape are electronically switched by electronically controlling the switching elements connected to the channel magnetic heads of a multichannel magnetic head unit.

While the above-mentioned embodiment switches the tracks, that is, the magnetic heads $13_1$ to $13_n$, for each track, the switching may be performed with the interval of any number of tracks, for example, 2 or 3 tracks. When the switching is made every two tracks, the second channel $13_2$, for example, follows the final channel head $13_n$. Such switching of the magnetic head may readily be realized by properly producing the control pulses from the control circuit 19. Further the same may be realized by manually applying the control pulse to the control circuit for the selection of a desired track. The present invention, which has been described by using a magnetic tape, may be applied to a magnetic record/reproduction system using a magnetic disc, a magnetic drum or the like. The single turn type thin magnetic head, used in the above-mentioned embodiment, may be replaced by a multiturn type thin magnetic head.

As described above, the present invention uses a multichannel thin magnetic head, so that the interval between the adjacent recording tracks may be narrowed and that the setting of the magnetic head may be easily made. The pure electronic control of the switching of the tracks on the magnetic tape and between the record and reproduction modes, simplifies the structure of the head section, reduces the cost of manufacture of the apparatus, and makes maintenance easy.

What is claimed is:

1. A magnetic record/reproduction apparatus of the stationary head type comprising:
    multichannel magnetic heads;
    signal lines for carrying record signals and reproduction signals;
    an electronic switching circuit coupled between said magnetic heads and said signal lines; and
    switching control means which selectively supplies switching control signals to said electronic switching circuit for selectively connecting said magnetic heads to said signal lines, said switching control means including:
    a calculator for calculating an allowable recording or reproduction time as a function of a track length and a traveling speed of the magnetic tape;
    a timer for counting the recording or reproduction time and for generating a count value output signal;
    a comparator coupled to said timer and to said calculator for comparing the count value of the output of said timer with said allowable time calculated by said calculator and, when said count value and said allowable time coincide with each other, said comparator producing an output signal; and
    a shift register responsive to said output signal from said comparator for supplying said switching control signals to said electronic switching circuit for selectively connecting said magnetic heads to said signal lines.

2. The magnetic record/reproduction apparatus of claim 1, wherein:
    said electronic switching circuit comprises a plurality of electronic switching elements connected to said multichannel magnetic heads, respectively; and
    said switching control means successively supplies said switching control signals to respective ones of said switching elements.

3. The magnetic record/reproduction apparatus of claim 1 or 2, wherein said signal lines correspond respectively to said magnetic heads, and said switching control circuit controls said switching circuit so as to connect said magnetic heads to said signal lines successively in turn, one after the other.

4. The magnetic record/reproduction apparatus of claim 1 or 2, wherein said multichannel magnetic heads each are of the single turn type.

5. The magnetic record/reproduction apparatus of claim 1 or 2, wherein said signal lines correspond respectively to said magnetic heads, and said electronic switching circuit selectively connects said respective signal lines to said magnetic heads.

* * * * *